United States Patent [19]

Garwin et al.

[11] Patent Number: 4,772,763

[45] Date of Patent: Sep. 20, 1988

[54] DATA PROCESSING INFORMATION INPUT USING OPTICALLY SENSED STYLUS FEATURES

[75] Inventors: Richard L. Garwin, Scarsdale; James L. Levine, Yorktown Heights, both of N.Y.

[73] Assignee: International Business Machines Corporation, Armonk, N.Y.

[21] Appl. No.: 89,288

[22] Filed: Aug. 25, 1987

[51] Int. Cl.[4] .............................................. G08C 21/00
[52] U.S. Cl. ...................................... 178/18; 340/706
[58] Field of Search .................... 178/18, 19; 340/706, 340/707, 709, 365 P; 250/221, 224, 491.1

[56] References Cited

U.S. PATENT DOCUMENTS

| | | | |
|---|---|---|---|
| 4,198,623 | 4/1980 | Misek et al. | 340/365 |
| 4,317,956 | 3/1982 | Torok et al. | 178/18 |
| 4,318,096 | 3/1982 | Thornburg et al. | 340/706 |
| 4,345,313 | 8/1982 | Knox | 364/515 |
| 4,501,931 | 2/1985 | Ohya et al. | 178/18 |
| 4,553,842 | 11/1985 | Griffin | 356/375 |
| 4,558,313 | 12/1985 | Garwin et al. | 340/709 |
| 4,568,182 | 2/1986 | Modjallal | 356/1 |
| 4,642,422 | 2/1987 | Garwin et al. | 178/18 |

FOREIGN PATENT DOCUMENTS 1575420 9/1980 United Kingdom .

OTHER PUBLICATIONS

N. S. Caswell, et al.,-Data Processing Input Interface (YO985-019).
L. K. Stephens-Moving Eraser for Graphics Screen (AT983-026).
G. A. Flurry-Real-Time Rub-Out Erase for an Electronic Handwriting Facility (YO983-054).

Primary Examiner—Stafford D. Schreyer
Attorney, Agent, or Firm—Alvin J. Riddles; John J. Goodwin

[57] ABSTRACT

User-machine interaction through a touch input display screen is enhanced through the use of surface coding in the form of stylus diameter or reflectivity peripheral surface features that are sensed in optical sensing apparatus.

9 Claims, 3 Drawing Sheets

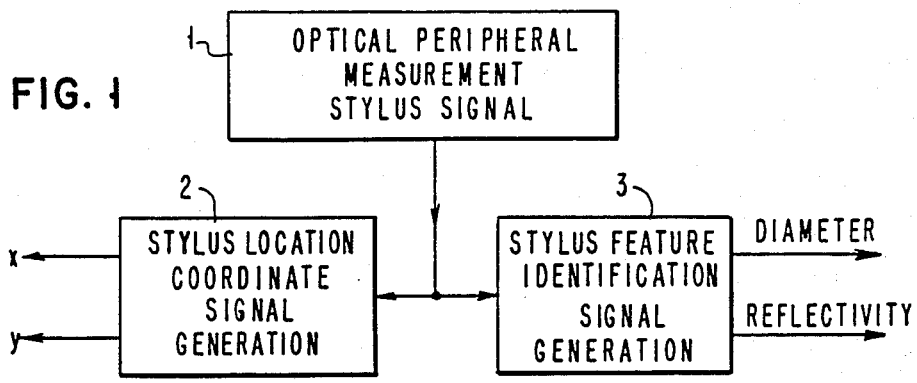
FIG. 1
FIG. 2
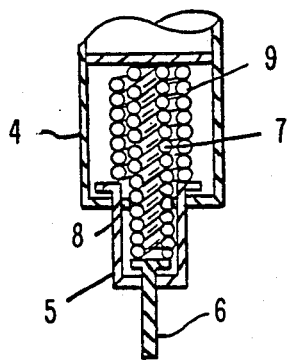
FIG. 3
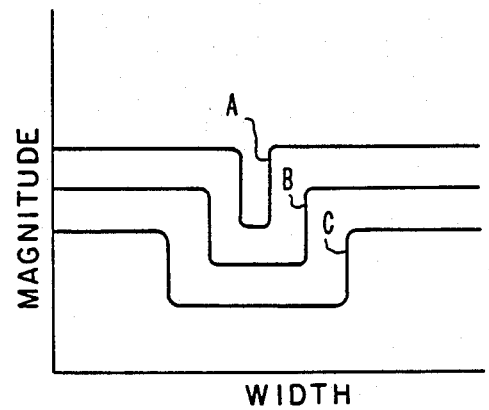
FIG. 4
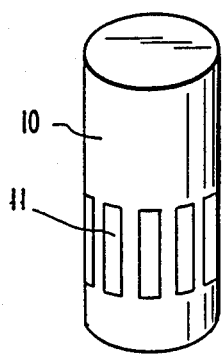
FIG. 5
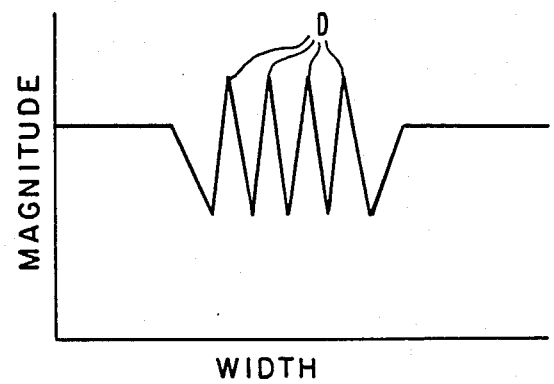

DATA PROCESSING INFORMATION INPUT USING OPTICALLY SENSED STYLUS FEATURES

DESCRIPTION

1. Technical Field

The technical field of the invention is that of providing user-machine information transfer through a display screen.

There is a class of display screens for data processing interaction in which information is entered into the screen and operations are performed on information displayed on the screen using a simple object such as a pencil or even the finger of the operator and no electrical connection into the data processing apparatus is involved.

Such display screens have come to be known in the art as touch-input devices and the object employed to enter the information has acquired the generic term of stylus.

2. Background Art

There has been some effort in the touch input device art to carry the user-machine interaction a step further than the mere identification of location.

While some stylus size information is identifiable in the surface wave type of touch screen variations in vertical pressure and stylus deformation operate to limit precision.

Touch-input devices heretofore in the art have been measuring the location of the stylus and then using that location information to direct further interaction. An illustration of this is the assignment of a particular area of the screen as a "soft key" which when touched directs a specific action. An example of this type of practice is shown in U.S. Pat. No. 4,558,313.

In the type of technology involving a stylus with a direct electrical connection into the data processing equipment, apparatus has been constructed directed to the use of a feature of the stylus to introduce information into the data processor in addition to the location of the stylus.

In U.S. Pat. No. 4,318,096 there is illustrated the ability to widen a displayed line by pressure on the stylus which actuates a pressure transducer in the stylus.

The entry of color information by using a separate direct electrically connected stylus for each color, is described in U.S. Pat. No. 4,501,931.

Separate operations have been employed in the art to achieve changes in displayed information.

In U.S. Pat. No. 4,317,956, in a two screen system, an item removed on one screen is shown as being erased on the other.

In U.S. Pat. No. 4,345,313 the depressing of buttons is employed to widen displayed lines.

It will be apparent that it would be advantageous in the art, once the location of a stylus is established in a touch screen display, to be able with simplicity to execute a further user-machine data processing interaction step.

BRIEF DESCRIPTION OF THE DRAWINGS

FIG. 1 is a block diagram illustrating the signal processing employed in the invention;

FIG. 2 is a view of a portion of a stylus illustrating the different diameter surface feature;

FIG. 3 is an illustration of the type of signal that would be optically sensed from different stylus diameters;

FIG. 4 is a view of a portion of a stylus illustrating the different reflectivity surface feature;

FIG. 5 is an illustration of the type of signal that would be optically sensed from a stylus with different reflectivity;

DISCLOSURE OF THE INVENTION

Figure 6:
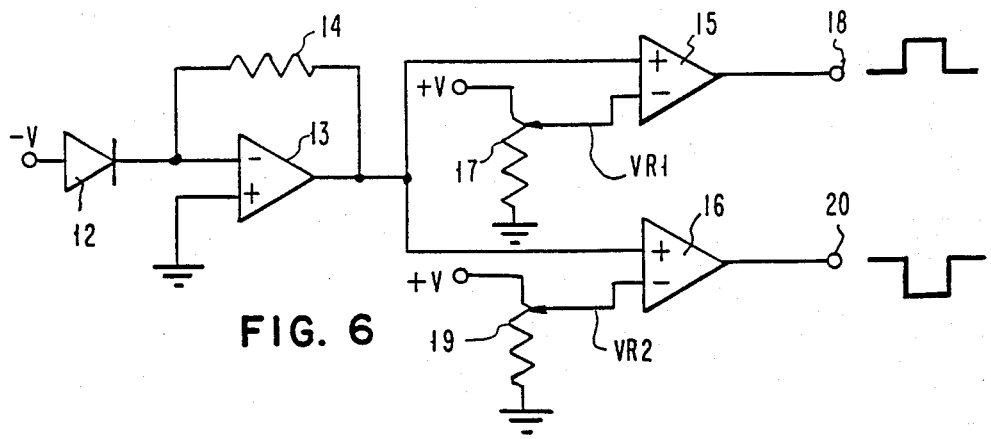
FIGS. 6-13 are circuit and signal development illustrations of the invention as applied to a light interrupt touch input interface showing the type of signals resulting from surface coding of the stylus.

The invention provides the ability to introduce a further user-machine interaction step in addition to stylus location in an optically sensed touch screen type of interface, by providing a stylus with features that operate to provide superimposed signal information on the stylus location signals.

In accordance with the invention this is accomplished by employing an optical stylus sensing technology that produces signals in identifying location that are based on the stylus periphery and employing stylus surface features to superimpose selected information signals on the location signals.

The surface features of an optically sensed stylus that can most readily be employed with the invention are the diameter and reflectivity.

For clarity of explanation, the term stylus will be used for the manually positioned input device and the term will include the finger of the operator; however, the finger of the operator, while convenient is generally employed only in the lower precision type of applications.

The providing of the combination of stylus cross sectional sensing and stylus feature produced superimposed signals on the stylus position location signals in an optically sensed touch screen type of data processing interface provides the ability in addition to the establishment of the stylus location to, with complete simplicity, introduce the further interaction steps of, for example, distinguishing between writing and erasing, selection of colors, selection of line width and density and initiation of the next specific action such as performing an operation on an item whose location has been established by the stylus. The resulting combination provides gains in efficiency and accuracy.

Referring to FIG. 1, a signal processing block diagram is provided. In element 1 optical sensing technology is employed that develops a signal based on the periphery of the stylus.

In general the technology where light in a plane essentially parallel to the surface of the touch screen is interrupted by the stylus will develop a signal on which signals indicative of surface features of the stylus can be superimposed. There are two basic types. The first is based on a grid of light beam sources and photosensor receivers such as is illustrated in U.S. Pat. No. 4,198,623. The second is based on the disruption of continuously scanning light such as is illustrated in U.S. Pat. No. 4,558,313. Both types develop a location signal that begins and ends with the periphery of the stylus so that, in accordance with the invention, signals indicative of surface features of the stylus can be superimposed thereon.

In FIG. 1, the signal from element 1 contains information of both the location of the stylus and superimposed thereon information concerning features of the stylus. In element 2 the location signal is processed into digital coordinate information signals. Generally, there are either cartesian as illustrated or polar coordinate signals that are compatible with the data processing apparatus involved. In element 3 the superimposed signals that are produced by the surface features of the stylus are processed into independent interaction direction signals. While a single signal for each of diameter and reflectivity is shown it will be apparent that as many signals as distinguishable features may be produced.

In FIG. 2, an illustration is provided of a stylus having the surface feature of the capability of changing diameter in response to pressure.

The stylus of FIG. 2 has a body 4 with a first diameter and within it an intermediate diameter portion 5 and within portion 5 a smaller diameter portion 6 all telescoping. The smaller diameter member 6 is held in the extended position by a spring 7 and is prevented from telescoping beyond being flush with element 5 by shoulder 8. The element 5 is held in the extended position by a spring 9 which is somewhat stronger than spring 7. With vertical pressure on the stylus the small diameter portion 6 telescopes into the portion 5 which in turn, with further pressure, telescopes into portion 4.

With this type structure, interaction steps are communicated by changing the diameter disrupting the light. The signal produced will be variations in width superimposed on the overall signal.

In FIG. 3, examples of the types of signals provided by the structure of FIG. 2 are illustrated. The signals are separated vertically for clarity. When the portion 6 is extended the narrower signal A is produced. As the portion 6 is telescoped into portion 5 the greater width produces signal B and the wider portion 4 produces signal C. Since the springs 7 and 9 keep the structure extended, an increasing vertical pressure on the stylus operates to produce sequential signals B and C as desired.

For the light grid type of technology the number of beams broken by the stylus gives a measure of stylus diameter, the degree of precision being dependent on the linear spacing of the beams. Present technology of this type has spacing of approximately 5 millimeters which limits the amount of peripheral information that can be sensed from a stylus of reasonable size.

For the scanning light type of technology, the diameter of a cylindrical stylus is the angular subtend of the stylus as measured by the scanner multiplied by the distance from the scanner. The distance is directly calculated using the stylus coordinates which are generated from information in the signal produced at the disrupting of the scan light. The actual diameter would be as set forth in equation 1.

$$\text{Diameter} = A_s \sqrt{(x - x_s)^2 + (y - y_s)^2} \quad \text{Equation 1}$$

where x and y are the coordinates of the stylus
$x_s$ and $y_s$ are the coordinates of the scanner and
$A_s$ is the angular subtend Referring to FIGS. 2 and 3, for example, the portion 6 providing the finest resolution is considered to be the condition for normal interaction and would produce the signal in FIG. 3 labelled A, then a force on the stylus in the direction of the screen will cause 6 to telescope into 5 and produce the signal shown as B which through the calculation of equation 1 provides a unique value for Diameter D larger than the value of Diameter D for portion 6.

Further pressure on the stylus in the direction of the screen will cause both 6 and 5 to telescope into 4 providing the signal C, which will provide an even greater value for Diameter D.

The difference in stylus D values can be used to select between such interactions as writing and erasing, selection of colors, selection of line size where the next interaction step following positioning at the desired location is accomplished by pushing to change the diameter.

In FIG. 4, a portion of a stylus 10 is shown illustrating the surface feature of a difference in reflectivity. In FIG. 4, a portion of the stylus 10 is shown having around the periphery thereof regions 11 of different reflectivity. The signal produced by the reflectivity variation will be variations in signal magnitude superimposed on the overall signal.

Referring next to FIG. 5, wherein within the overall signal caused by the disruption of the light there will be a series of pulses D as the different reflectivity regions 11 affect the light. Such styli may be distinguished by degrees of reflectivity variation such as a radical change, the number of stripes or ratio of width of stripes depending on the sensitivity of the apparatus. By means, for instance, of increasing force on the stylus, an internal cylinder can be rotated to change the shape or reflectivity of the stripes, without changing the overall diameter.

Within the principles set forth many variations will be apparent to one skilled in the art. For example, a stylus may be used with one end for writing and having a different size or reflectivity on the other end to indicate erasing. Further spiral spring or foam cone types provide continuously selectable diameter change in response to pressure. The stylus need not be round and where oblong in cross section a different signal would be developed by the optical sensing device depending on how it was held. Combinations of reflectivity and diameter can be employed for different coding.

In accordance with the invention it will be apparent that through the combined use of the disruption of light type of touch screen interface and stylus diameter and reflectivity information, next interaction step information becomes immediately available in machine readable form in a highly rugged, accurate and simple structure.

BEST MODE OF CARRYING OUT INVENTION

The principles described heretofore will be applied to a sweeping light interrupt type touch-input screen device. Such device is described in U.S. Pat. No. 4,558,313 and in co-pending application Ser. No. 789,610 filed Oct. 21, 1985. In the sweeping light disruption type device, a photosensor provides a photo-current indicative of the background light level. This current is affected by the presence of a start signal and then by the disruption of the beams. The time is a measure of the angle at which the event occurred.

Referring to FIG. 6, a sensing circuit of a type compatible with the principles of U.S. Pat. No. 4,558,313 and co-pending application Ser. No. 789,610 is illustrated in which a photosensor 12 receiving light illustrated as an arrow has power supplied by a voltage −V with the output of the photosensor 12 connected through the − terminal of a standard operational amplifier 13 bridged with a standard reference resistor 14 and with the terminal + thereof connected to ground. The output of amplifier 13 enters the + terminal of parallel voltage comparators 15 and 16. In voltage comparator 15, a high reference voltage VR1 for sensing positive signals such as a positive start light variation such as would occur if a light were sent directly into it, is established by tapping off from a potentiometer 17 between +V and ground. At terminal 18 there is delivered the positive digital signal corresponding to the start signal. In voltage comparator 16 a lower reference voltage VR2 for sensing the negative background light variation when the stylus disrupts the light is established by tapping into a potentiometer 19 between +V and ground at a level to establish the − level in the comparator 16. At terminal 20 the digital signal is delivered that corresponds to the light variation that occurs when the stylus disrupts the light level.

Figure 7:
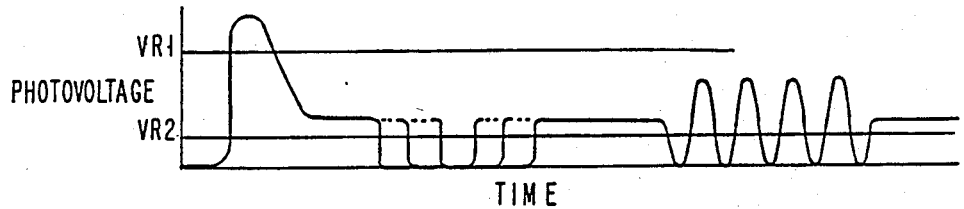

In FIG. 7, the relationship of the photovoltage of photosensor 10 in relation to time is illustrated showing the positive and negative threshold VR1 and VR2 levels and showing as dotted representative illustrations of the surface feature signals A, B, C and D. The D signal has been moved in time to facilitate illustration, however, it will be apparent that the D signals may be superimposed on the A, B and C signals.

Figure 8:
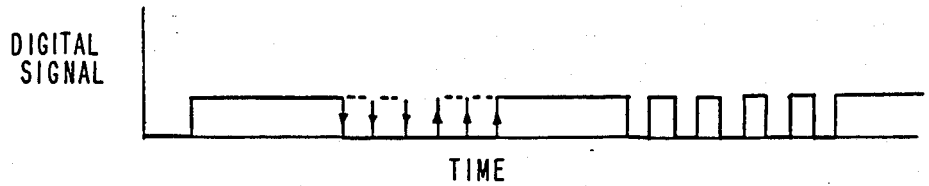

In FIG. 8, the results of the photovoltage in FIG. 7 as digital signals from terminals 18 and 20 of FIG. 6 related to timing of the sweep, are shown as digital signals.

Figure 9:
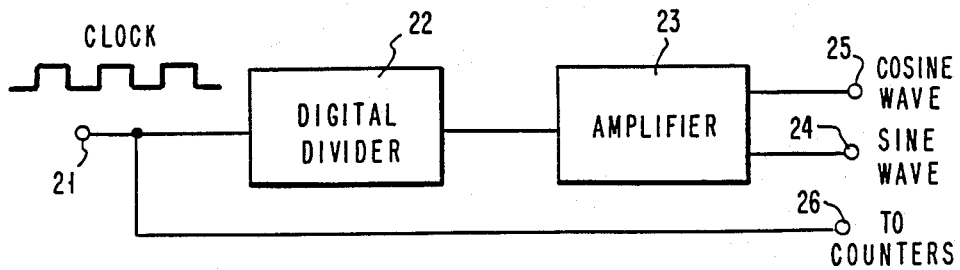

In FIG. 9, a diagram is shown converting clock signals to the movement of the sweep.

In FIGS. 7, 8 and 9 during the portion of the rotation where the sweep is over the touch input screen, the output of amplifier 13 is between VR2 and VR1 so long as there is no stylus present. In a typical construction at the point labelled "Start" a revolving mirror not shown that is used as a source of sweeping light, is arranged to send the light directly into the photosensor producing a sharp positive pulse which is converted in the amplifier 15 to the positive digital pulse at terminal 18. For the light variation event when the stylus disrupts the light, the difference in light level is such that the output of amplifier 12 is less than VR2 and a negative digital signal from amplifier 16 appears at terminal 20.

Since in an integrated light, timing and rotational arc displacement system, the movement of the scanning light during a sweep over the touch screen is used to provide the start signal and keep track of the arc of the sweep, it is necessary to provide scan motor driving signals and timing signal development.

Referring to FIG. 9, a source of uniform timed digital pulses is provided at terminal 21 from a standard clock. The digital pulses are passed through a standard digital divider circuit element 22 and a tuned amplifier 23 to provide a separate source 24 of sine waves and a separate source 25 of cosine waves, which are the standard input signals of a two-phase reluctance multiple pole synchronous type motor which can drive a mirror sweeping the light over the screen surface. The clock pulses from terminal 21 are also provided at terminal 26 to standard counters, not shown which provide the time scale of FIG. 8, keep track of the pulses supplied to the synchronous scanning light motor and hence the arc traversed and of the number of pulses corresponding to the beginning, intermediate and end of each light variation event as shown in FIGS. 7 and 8. Because the synchronous motor moves through an angular arc related to the pulses provided, the trigonometric functions of the angles resulting from the rotational arc can be calculated as set forth in the referenced U.S. Pat. No. 4,558,313 and co-pending application Ser. No. 789,610.

In accordance with the invention the presence of diameter related surface features will produce variations in width of the photovoltage signal and the presence of reflectivity related surface features will produce variations in signal height.

In FIGS. 7 and 8 the photovoltage variations produced by the presence of signal types A, B, C and D of FIGS. 3 and 5 are illustrated. In a system using a device that converts shaft rotation to angular displacement code signals commonly known as a shaft encoder or code disc the axis labelled time would then be labelled angle. Such a device is shown in UK Pat. No. 1,575,420 published Sept. 24, 1980.

In both FIGS. 7 and 8, the widest diameter of the stylus would correspond to signal C with signals B and A being narrower. In contrast, the reflectivity signals D, are an alternating series of rises and drops in accordance with reflectivity variations of the stylus. Should it be desirable the stylus could be equipped with a highly reflective portion which would provide a large positive pulse. Recognition of such a feature could be facilitated by providing a higher reference threshold than VR1.

It will be apparent referring to FIGS. 7, 8 and 9 that, in addition to establishing rotational arc, there is also in the ability to sense both positive and negative variations in photovoltage, and to set voltage reference levels, the ability to evaluate superimposed stylus surface feature coding information by translating both beginning and end and intermediate signals of stylus light disruption photovoltage variations into specific identifiable digital pulses.

Referring next to FIGS. 10, 11, 12 and 13 an illustration example is provided of the correlation of the digital signals of FIG. 8 with the status feature type identification in element 3 of FIG. 1.

The example procedures involve extracting the stylus feature information by comparing with selected example diameters and selected reflectivity changes, the type of stylus having been established in the equipment as a part of a setting up procedure.

Figure 10:
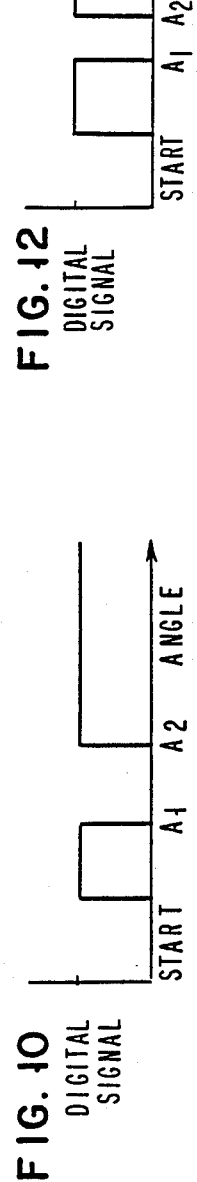

Considering first the variable diameter type as illustrated in connection with FIG. 2. Referring to FIG. 10, the digital signal with respect to angle illustrates that the stylus signal will begin at angle $A_1$ and end at angle $A_2$. The angle through the center of the stylus would be obtained from equation 2.

$$A = (A_1 + A_2)/2 \qquad \text{Equation 2}$$

The angle A through the center of the stylus is then used in accordance with the equations in, for example, U.S. Pat. No. 4,558,313 and co-pending application Ser. No. 789,610 to compute the stylus coordinates X Y, assuming cartesian coordinates.

The angular subtend As is calculated as shown in equation 3.

$$As = A_1 - A_1 \qquad \text{Equation 3}$$

Equation 1 is next used to calculate the actual stylus diameter hereinafter referred to as D.

Figure 11:
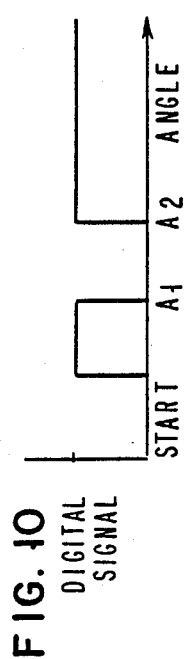

The diameter D is compared in element 3 of FIG. 1 with a stored list of expected diameters using as an illustrative technique the flow chart of FIG. 11.

In FIG. 11, D(I) will be the expected diameters stored with I being an integer from 1 to N. T(I) will be a tolerance which may vary with size. The program illustrated in the flow chart systematically increments until a stylus size integer is delivered to an execution program such as is illustrated in U.S. Pat. No. 4,558,313 or a report=0 signal is delivered indicating no valid stylus size detected.

Considering next an example detection of the type of coding involving a difference in reflectivity as is illustrated in connection with FIGS. 4 and 5.

Figure 12:
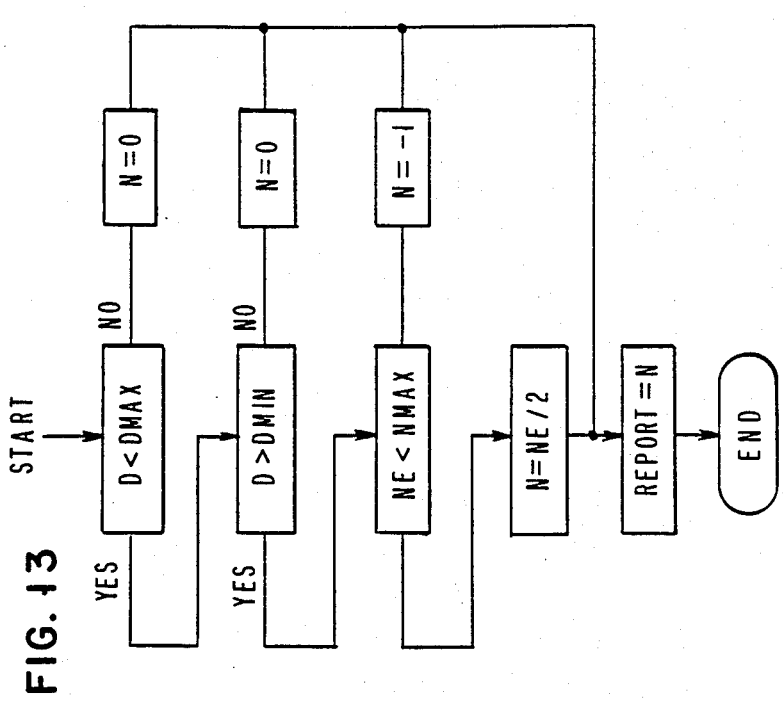

Referring to FIG. 12, the signal contains a number m of edges starting at angle $A_1$ and ending at angle $A_m$, the periphery of the stylus. In sensing the edges the object is an algorithm that returns, to an execution program such as is illustrated in U.S. Pat. No. 4,558,313, the number m.

The angle to the center of the stylus is as set forth in equation 4.

$$A = (A_1 + A_m)/2 \qquad \text{Equation 4}$$

The value A is used in connection with the equations of the particular touch screen device being employed to compute the stylus coordinates (X, Y in the case of cartesian coordinates). The angular subtend As is $A_m - A_1$.

The actual diameter of the stylus is calculated as shown in equation 1.

The calculated diameter can be compared within some tolerance with the stored known diameter as a cross check and a special integer type signal returned to the execution program if the diameter is invalid.

When stylus validity is established, the number of edges Ne is counted and the value of m is as set forth in equation 5.

$$m = N_e/2 \qquad \text{Equation 5}$$

Within the principle of the invention there is room for many cross checks. In the case of the number m if it were to be larger or smaller than a stored tolerance of expected value an integer such as a "−1" can be returned to the execution program to indicate an invalid stylus.

Figure 13:
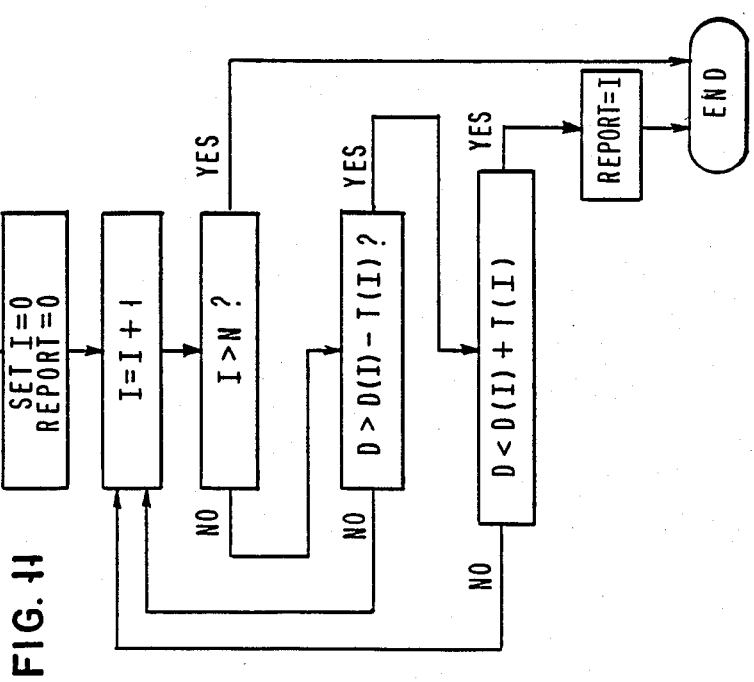

A flow chart employing the above elements using the calculated value of D as the diameter is provided in FIG. 13.

Where extraneous signal edges are present, as for example, if user rests his palm on the display, the stylus can still be located if it is encoded with an easily identifiable pattern such as a specific number of stripes.

What has been described is the ability in connection with a light responsive input touch screen to employ stylus peripheral information for coding purposes and thereby to facilitate function selections such as write/erase, action initiation, calligraphic input and color selection.

Having thus described our invention, what we claim as new and desire to secure by Letters Patent is:

1. In a light responsive touch-input data processing device employing a touch-input stylus, the improvement comprising the introduction of function selection information through superimposed signals on stylus location signals indicating variations in peripheral condition of the stylus.

2. The device of claim 1 wherein said peripheral condition variation is a change in diameter.

3. The device of claim 1 wherein said peripheral condition variation is a change in reflectivity.

4. In a user-machine interaction data processing interface of the type having a display screen on which the location of a stylus that has no electrical connection to the data processor is employed as an information input, the information introducing improvement comprising providing a stylus having at least one surface feature of at least one of localized diameter and reflectivity difference means for producing a sweeping light beam variation signal representative of the location of said stylus having as signal beginning and ending a signal level change in combination correlatable with the peripheral extent of said stylus, and means for detecting signals superimposed on said location signal having at least one of width and magnitude signal difference with respect to said location signal.

5. The improvement of claim 4 wherein said means for detecting includes separate signal processing operations for establishing location coordinates for said stylus and for producing data processing signals indicative of the presence of at least one of width and magnitude signals superimposed on said stylus location signal between said beginning and ending signal level changes.

6. A multifunction user-machine interaction data processing display screen interface comprising in combination manually positioned input stylus means having a cross section dimension and having a surface feature of at least one of a localized difference in cross section and reflectivity surface feature, light signal means operable to produce in the presence of said stylus means at a location on said display screen a signal having as signal beginning and ending a signal level change in combination correlatable with the cross section extent of said indicator means and detection means operable to identify from said light signal means signal location coordinate information for said indicator means and surface feature information carried by said stylus means.

7. The improvement of claim 6 wherein said means for detecting includes separate signal processing operations for establishing location coordinates for said stylus and for producing data processing signals indicative of the presence of at least one of width and magnitude signals superimposed on said stylus location signal between said beginning and ending signal level changes.

8. The improvement of claim 7 wherein said means for detecting includes a photosensor in series with a plurality of reference voltage comparator signal generator devices.

9. The improvement of claim 8 wherein said signal processing operations for establishing location coordinates includes signal generation for sweep movement and timing from the same source.

* * * * *